United States Patent
Bienerth et al.

(10) Patent No.: US 9,410,022 B2
(45) Date of Patent: Aug. 9, 2016

(54) SHEETLIKE STRUCTURE OR SHAPED ARTICLE COMPRISING LATENT HEAT STORAGE MEDIA

(71) Applicant: Wacker Chemie AG, München (DE)

(72) Inventors: Holger Bienerth, München (DE); Klaus-Jürgen Eder, Mitterskirchen (DE)

(73) Assignee: WACKER CHEMIE AG, München (DE)

( * ) Notice: Subject to any disclaimer, the term of this patent is extended or adjusted under 35 U.S.C. 154(b) by 0 days.

(21) Appl. No.: 14/433,723

(22) PCT Filed: Oct. 9, 2013

(86) PCT No.: PCT/EP2013/071010
§ 371 (c)(1),
(2) Date: Apr. 6, 2015

(87) PCT Pub. No.: WO2014/056963
PCT Pub. Date: Apr. 17, 2014

(65) Prior Publication Data
US 2015/0274906 A1    Oct. 1, 2015

(30) Foreign Application Priority Data
Oct. 9, 2012  (DE) .......................... 10 2012 218 378

(51) Int. Cl.
| | | |
|---|---|---|
| C08J 5/18 | (2006.01) |
| C08K 9/10 | (2006.01) |
| C09K 5/06 | (2006.01) |
| F28D 20/02 | (2006.01) |
| B29C 43/00 | (2006.01) |
| B29C 43/24 | (2006.01) |
| B29C 45/00 | (2006.01) |
| B29K 101/12 | (2006.01) |
| B29L 7/00 | (2006.01) |

(52) U.S. Cl.
CPC ................. C08J 5/18 (2013.01); B29C 43/006 (2013.01); B29C 43/24 (2013.01); B29C 45/0013 (2013.01); C08K 9/10 (2013.01); C09K 5/063 (2013.01); F28D 20/023 (2013.01); B29K 2101/12 (2013.01); B29L 2007/002 (2013.01); C08J 2329/04 (2013.01); C08J 2331/04 (2013.01); C08J 2333/10 (2013.01); C08J 2391/08 (2013.01); Y02E 60/145 (2013.01)

(58) Field of Classification Search
CPC ........ C08K 9/10; B29C 43/006; B29C 43/24; B29C 45/0013; C08J 5/18
See application file for complete search history.

(56) References Cited

U.S. PATENT DOCUMENTS

| | | | |
|---|---|---|---|
| 5,565,132 A | 10/1996 | Salyer | |
| 6,200,681 B1 | 3/2001 | Jahns et al. | |
| 7,575,804 B2 * | 8/2009 | Lang-Wittkowski ...... B01J 2/20 427/212 |
| 8,070,876 B1 | 12/2011 | Jiang | |
| 2001/0000517 A1 | 4/2001 | Zuckerman et al. | |
| 2003/0118822 A1 | 6/2003 | Jahns et al. | |
| 2004/0234738 A1 | 11/2004 | Jahns et al. | |
| 2006/0272281 A1 | 12/2006 | Marshall et al. | |
| 2008/0166555 A1 | 7/2008 | Lang-Wittkowski et al. | |
| 2008/0318048 A1 | 12/2008 | Amrhein et al. | |
| 2011/0108241 A1 | 5/2011 | Driscoll et al. | |
| 2011/0169179 A1 | 7/2011 | Gueret et al. | |
| 2011/0247215 A1 | 10/2011 | Schmidt et al. | |
| 2015/0001440 A1 | 1/2015 | Kompalik et al. | |

FOREIGN PATENT DOCUMENTS

| | | |
|---|---|---|
| DE | 102005002411 A1 | 7/2006 |
| EP | 1321182 A1 | 6/2003 |
| EP | 1484378 A1 | 12/2004 |
| WO | 99/24525 A1 | 5/1999 |
| WO | 03016650 A1 | 2/2003 |
| WO | 2006092439 A1 | 9/2006 |
| WO | 2010076118 A1 | 7/2010 |
| WO | 2011/071402 A1 | 6/2011 |
| WO | 2012/069976 A1 | 5/2012 |
| WO | 2013135771 A1 | 9/2013 |

OTHER PUBLICATIONS

Fox T. G., Bull. Am. Physics Soc. 1, 3, p. 123 (1956).
Polymer Handbook 2nd Edition, J. Wiley & Sons, New York (1975), 58 pp.

* cited by examiner

Primary Examiner — Vickey Nerangis
(74) Attorney, Agent, or Firm — RatnerPrestia

(57) ABSTRACT

The invention provides methods for producing sheetlike structures or shaped articles that comprise latent heat storage media, characterized in that mixtures comprising one or more microcapsules which contain one or more latent heat storage media, and one or more polymers based on one or more ethylenically unsaturated monomers selected from the group consisting of vinyl esters, (meth)acrylic esters, vinylaromatics, olefins, 1,3-dienes and vinyl halides, are processed by means of thermoplastic shaping techniques.

8 Claims, No Drawings

SHEETLIKE STRUCTURE OR SHAPED ARTICLE COMPRISING LATENT HEAT STORAGE MEDIA

CROSS-REFERENCE TO RELATED APPLICATIONS

This application is the U.S. National stage filing of International Application No. PCT/EP2013/071010, filed 9 Oct. 2013, and claims priority of German application number 10 2012 218 378.7, filed 9 Oct. 2012, the entireties of which applications are incorporated herein by reference.

FIELD OF THE INVENTION

The invention relates to processes for the production of moldings or sheet materials comprising latent heat accumulators, to the moldings or sheet materials obtainable therefrom, and to use thereof by way of example in the construction industry for the coating of ceilings.

BACKGROUND OF THE INVENTION

Latent heat accumulators are materials which at certain temperatures undergo reversible thermodynamic state changes, for example solid/liquid phase transitions, and extract the associated enthalpy of phase change from the environment and, respectively, release said enthalpy into the environment. Latent heat accumulators can therefore prevent, or at least mitigate, temperature variations in the region of their thermodynamic state change, for example their melting point or freezing point. Examples of commonly used materials that accumulate latent heat are paraffin oils, fatty acids, and fatty waxes. Latent heat accumulators are used in a wide variety of applications: US 2001000517 describes the coating of textiles with materials of this type. U.S. Pat. No. 5,565,132 describes processes in which compositions comprising latent-heat-accumulating material, polymers, and silica particles are processed by way of a melt to give sheets, pellets, or fibers.

However, when latent heat accumulators are present in the liquid phase they are easily released into the environment. A frequent recommendation intended to prevent this is that latent-heat-accumulating material be sheathed with a higher-melting-point material, as described by way of example in US 2011169179A. WO 99/24525 teaches microcapsules in which a capsule wall made of highly crosslinked methacrylic ester polymers surrounds the latent-heat-accumulating material. US 2006272281, U.S. Pat. No. 8,070,876, WO11071402, and US 2011108241A describe the use of microcapsules of that type in construction applications. Another challenge consists in the further processing of these microcapsules to give marketable products, as discussed by way of example in EP1484378. The plastics technology sector makes very wide use of thermoplastic processes. However, a problem arising during the thermoplastic processing of the microcapsules is that a considerable proportion of the microcapsules is easily damaged, with the consequence that when the latent-heat-accumulating material undergoes transition to the liquid phase it can be released from the microcapsules into the environment, with resultant loss of the advantage of the microcapsules. Problems of this type arise by way of example during the thermoplastic processing of compositions which comprise polyurethane casting resins alongside the microcapsules.

SUMMARY OF THE INVENTION

Against this background it was an object to develop novel approaches that permit processing of microcapsules comprising latent heat accumulators to give moldings or sheet materials. A further intention was thus to provide access to moldings or sheet materials which comprise the greatest possible proportion of the microcapsules mentioned. The shape of the moldings or sheet materials, for example layer thicknesses, should be amenable to variation as desired within a wide range.

Surprisingly, when microcapsules comprising latent heat accumulators were processed thermoplastically together with polymers based on ethylenically unsaturated monomers said object was achieved.

The invention provides processes for the production of moldings or sheet materials comprising latent heat accumulators, characterized in that mixtures comprising one or more microcapsules and one or more polymers based on one or more ethylenically unsaturated monomers selected from the group comprising vinyl esters, (meth)acrylic esters, vinylaromatics, olefins, 1,3-dienes, and vinyl halides, where said microcapsules comprise one or more latent heat accumulators, are processed by means of thermoplastic forming techniques.

The invention further provides moldings or sheet materials comprising latent heat accumulators, said moldings or sheet materials being obtainable via thermoplastic forming of mixtures comprising one or more microcapsules, and one or more polymers based on one or more ethylenically unsaturated monomers selected from the group comprising vinyl esters, (meth)acrylic esters, vinylaromatics, olefins, 1,3-dienes, and vinyl halides, where said microcapsules comprise one or more latent heat accumulators.

DETAILED DESCRIPTION OF THE INVENTION

Examples of suitable vinyl esters are those of carboxylic acids having from 1 to 22 C atoms, in particular from 1 to 12 C atoms. Preference is given to vinyl acetate, vinyl propionate, vinyl butyrate, vinyl-2-ethylhexanoate, vinyl laurate, vinyl myristate, vinyl palmitate, vinyl stearate, vinyl arachinate, 1-methylvinyl acetate, vinyl pivalate, and vinyl esters of α-branched monocarboxylic acids having from 9 to 11 C atoms, for example VeoVa9$^R$ or VeoVa10$^R$ (trademarks from Resolution). Particular preference is given to vinyl acetate.

Examples of suitable acrylic esters or methacrylic esters are esters of unbranched or branched alcohols having from 1 to 22 C atoms, in particular from 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate, lauryl acrylate, myristyl acrylate, stearyl acrylate, palmityl acrylate, lauryl methacrylate, myristyl methacrylate, stearyl methacrylate, and palmityl methacrylate. Particular preference is given to methyl acrylate, methyl methacrylate, n-butyl acrylate, tert-butyl acrylate, and 2-ethylhexyl acrylate.

Preferred vinyl aromatics are styrene, methylstyrene, and vinyltoluene. Preferred vinyl halide is vinyl chloride. The preferred olefins are ethylene and propylene, and the preferred dienes are 1,3-butadiene and isoprene.

It is also optionally possible to copolymerize from 0.1 to 10% by weight, based on the total weight of the monomer mixture, of ancillary monomers. It is preferable to use from 0.5 to 5% by weight of ancillary monomers. Examples of ancillary monomers are ethylenically unsaturated mono- and dicarboxylic acids, preferably acrylic acid, methacrylic acid, fumaric acid, and maleic acid; ethylenically unsaturated carboxamides and the corresponding nitriles, preferably acrylamide and acrylonitrile; mono- and diesters of fumaric acid and maleic acid, for example the diethyl and diisopropyl esters, and maleic anhydride, ethylenically unsaturated sulfonic acids and salts thereof, preferably vinylsulfonic acid and 2-acrylamido-2-methylpropanesulfonic acid. Other examples are silicon-functional comonomers, for example acryloxypropyltri(alkoxy)-, and methacryloxypropyltri (alkoxy)silanes, vinyltrialkoxysilanes, and vinylmethyldialkoxysilanes, where alkoxy groups present can by way of example be ethoxy and ethoxy propylene glycol ether moieties. Mention may also be made of monomers having hydroxy or CO groups, for example hydroxyalkyl esters of methacrylic acid and of acrylic acid, examples being hydroxyethyl, hydroxypropyl, and hydroxybutyl acrylate and methacrylate, and compounds such as diacetone-acrylamide and acetylacetoxyethyl acrylate and methacrylate.

It is preferable that the ethylenically unsaturated monomers comprise only one ethylenically unsaturated group.

Preference is given to homo- or copolymers which comprise one or more monomers from the group comprising vinyl acetate, vinyl esters of α-branched monocarboxylic acids having from 9 to 11 C atoms, vinyl chloride, ethylene, methyl acrylate, methyl methacrylate, ethyl acrylate, ethyl methacrylate, propyl acrylate, propyl methacrylate, n-butyl acrylate, n-butyl methacrylate, 2-ethylhexyl acrylate, styrene.

More preference is given to copolymers using vinyl acetate and ethylene; using vinyl acetate, ethylene, and a vinyl ester of α-branched monocarboxylic acids having from 9 to 11 C atoms; copolymers using vinyl acetate and one or more (meth)acrylic esters of unbranched or branched alcohols having from 1 to 15 C atoms, in particular methyl acrylate, ethyl acrylate, propyl acrylate, n-butyl acrylate, 2-ethylhexyl acrylate, and optionally ethylene; copolymers using one or more vinyl esters, ethylene, and one or more vinyl halides; copolymers using one or more (meth)acrylic esters of unbranched or branched alcohols having from 1 to 15 C atoms, for example n-butyl acrylate and 2-ethylhexyl acrylate, and/or methyl methacrylate; copolymers using styrene and one or more monomers from the group of methyl acrylate, ethyl acrylate, propyl acrylate, n-butyl acrylate, 2-ethylhexyl acrylate; copolymers using 1,3-butadiene and styrene, and/or methyl methacrylate, and optionally other acrylic esters; these mixtures mentioned can optionally also comprise one or more of the abovementioned ancillary monomers.

Particular preference is given to copolymers of one or more vinyl esters with from 1 to 50% by weight of ethylene; copolymers of vinyl acetate with from 1 to 50% by weight of ethylene and from 1 to 50% by weight of one or more other comonomers from the group of vinyl esters having from 1 to 12 C atoms in the carboxylic acid moiety, for example vinyl propionate, vinyl laurate, vinyl esters of alpha-branched carboxylic acids having from 9 to 13 C atoms, for example VeoVa9, VeoVa10, VeoVa11; copolymers of one or more vinyl esters, from 1 to 50% by weight of ethylene, and preferably from 1 to 60% by weight of (meth)acrylic esters of unbranched or branched alcohols having from 1 to 15 C atoms, in particular n-butyl acrylate or 2-ethylhexyl acrylate; and copolymers using from 30 to 75% by weight of vinyl acetate, from 1 to 30% by weight of vinyl laurate, or vinyl ester of an alpha-branched carboxylic acid having from 9 to 11 C atoms, and from 1 to 30% by weight of (meth)acrylic esters of unbranched or branched alcohols having from 1 to 15 C atoms, in particular n-butyl acrylate or 2-ethylhexyl acrylate, where these also comprise from 1 to 40% by weight of ethylene; copolymers using one or more vinyl esters, from 1 to 50% by weight of ethylene, and from 1 to 60% by weight of vinyl chloride; these polymers can also comprise the quantities mentioned of the ancillary monomers mentioned, and the data in % by weight here always give a total of 100% by weight.

Particular preference is also given to (meth)acrylic ester polymers such as copolymers of n-butyl acrylate or 2-ethylhexyl acrylate, or copolymers of methyl methacrylate using n-butyl acrylate and/or 2-ethylhexyl acrylate; styrene-acrylic ester copolymers using one or more monomers from the group of methyl acrylate, ethyl acrylate, propyl acrylate, n-butyl acrylate, 2-ethylhexyl acrylate; vinyl acetate-acrylic ester copolymers using one or more monomers from the group of methyl acrylate, ethyl acrylate, propyl acrylate, n-butyl acrylate, 2-ethylhexyl acrylate, and optionally ethylene; styrene-1,3-butadiene copolymers; these polymers can also comprise the quantities mentioned of ancillary monomers, and the data in % by weight here always give a total of 100% by weight.

Most preference is given to copolymers using vinyl acetate and from 5 to 50% by weight of ethylene; and copolymers using vinyl acetate, from 1 to 50% by weight of ethylene, and from 1 to 50% by weight of a vinyl ester of α-branched monocarboxylic acids having from 9 to 11 C atoms; and copolymers using from 30 to 75% by weight of vinyl acetate, from 1 to 30% by weight of vinyl laurate, or vinyl ester of an alpha-branched carboxylic acid having from 9 to 11 C atoms, and from 1 to 30% by weight of (meth)acrylic esters of unbranched or branched alcohols having from 1 to 15 C atoms, where these also comprise from 1 to 40% by weight of ethylene; and copolymers using vinyl acetate, from 5 to 50% by weight of ethylene, and from 1 to 60% by weight of vinyl chloride.

The method here for the selection of the monomers and, respectively, the selection of the proportions by weight of the comonomers is such that the resultant glass transition temperature Tg is generally ≤120° C., preferably from −50° C. to +60° C., still more preferably from −30° C. to +40° C., and most preferably from −15° C. to +20° C. The glass transition temperature Tg of the polymers can be determined in a known manner by means of differential scanning calorimetry (DSC). Tg can also be approximated by means of the Fox equation. According to Fox T. G., Bull. Am. Physics Soc. 1, 3, page 123 (1956), the relationship is: $1/Tg=x1/Tg1+x2/Tg2+ \ldots +xn/Tgn$, where xn is the mass fraction (% by weight/100) of the monomer n, and Tgn is the glass transition temperature in Kelvin of the homopolymer of the monomer n. Tg values for homopolymers are listed in Polymer Handbook 2nd edition, J. Wiley & Sons, New York (1975).

The polymers are produced in a known manner by way of example by the emulsion polymerization process or by the suspension polymerization process in the presence of emulsifiers or preferably of protective colloids, preferably by the emulsion polymerization process, where the polymerization temperature is generally from 20° C. to 100° C., preferably from 60° C. to 90° C., and in the case of copolymerization of gaseous comonomers such as ethylene operations can preferably be carried out under pressure, generally at from 5 bar to 100 bar. The polymerization is initiated by the water-soluble or monomer-soluble initiators or redox-initiator combinations commonly used for emulsion polymerization or suspension polymerization. Regulating substances can be used to control molecular weight during the polymerization. Protective colloids can be used for stabilization, optionally in combination with emulsifiers. The polymers preferably take the form of aqueous protective-colloid-stabilized dispersions.

Examples of protective colloids commonly used to stabilize the polymerization mixture are partially hydrolyzed or fully hydrolyzed polyvinyl alcohols; polyvinylpyrrolidones; polyvinylacetals; poly-saccharides in water-soluble form, for example starches (amylose and amylopectin), celluloses and carboxymethyl, methyl, hydroxyethyl, and hydroxypropyl derivatives thereof; proteins such as casein or caseinate, soya protein, gelatins; lignosulfonates; synthetic polymers such as poly(meth)acrylic acid, copolymers of (meth)acrylates having carboxy-functional comonomer units, poly(meth)acrylamide, polyvinyl-sulfonic acids, and water-soluble copolymers thereof; melamine-formaldehydesulfonates, naphthalene-form-aldehydesulfonates, styrene-maleic acid copolymers and vinyl ether-maleic acid copolymers. Preference is given to partially hydrolyzed or fully hydrolyzed polyvinyl alcohols. Particular preference is given to partially hydrolyzed polyvinyl alcohols with a degree of hydrolysis of from 80 to 95 mol % and with a Höppler viscosity of from 1 to 30 mPas in 4% aqueous solution (Höppler method at 20° C., DIN 53015).

Examples of suitable emulsifiers are anionic, cationic, or nonionic emulsifiers, for example anionic surfactants, such as alkyl sulfates having a chain length of from 8 to 18 C atoms, alkyl or alkylaryl ether sulfates having from 8 to 18 C atoms in the hydrophobic moiety and up to 40 ethylene oxide or propylene oxide units, alkyl- or alkylarylsulfonates having from 8 to 18 C atoms, esters and hemiesters of sulfosuccinic acid with monohydric alcohols or alkylphenols, and nonionic surfactants such as alkyl polyglycol ethers or alkylaryl polyglycol ethers having from 8 to 40 ethylene oxide units. The quantity of emulsifiers generally used is from 1 to 5% by weight, based on the total weight of the monomers. It is preferable to carry out polymerization without addition of emulsifiers.

The solids content of the resultant aqueous dispersions is preferably from 30 to 75% by weight, particularly preferably from 50 to 60% by weight.

In order to convert the polymers into water-redispersible polymer powders, the dispersions can, optionally after addition of other protective colloids as drying aid, be dried, for example by means of fluidized-bed drying, freeze drying or spray drying. It is preferable that the dispersions are spray dried. The spray drying here can take place in conventional spray drying systems, where the atomization can be achieved by means of single-, double-, or multiple-fluid nozzles, or by using a rotating disk. The selected discharge temperature is generally in the range from 45° C. to 120° C., preferably from 60° C. to 90° C., depending on system, resin Tg, and desired degree of drying. The viscosity of the feed to the nozzles is adjusted by way of the solids content in such a way so as to give a value <500 mPas (Brookfield viscosity at 20 revolutions and 23° C.), preferably <250 mPas. The solids content of the dispersion to be supplied to the nozzles is >35%, preferably >40%.

The total quantity generally used of the drying aid is from 0.5 to 30% by weight, based on the polymeric constituents of the dispersion. This means that the total quantity of protective colloid before the drying procedure is preferably to be at least from 1 to 30% by weight, based on polymer content; it is particularly preferable to use a total of from 5 to 20% by weight of protective colloid, based on the polymeric constituents of the dispersion. Examples of suitable drying aids are the abovementioned protective colloids.

A content of up to 1.5% by weight of antifoam, based on the main polymer in the material supplied to the nozzles, has often proven to be advantageous. The resultant powder can be modified with an antiblocking agent (anticaking agent) in order to increase capability for storage by improving resistance to blocking, in particular in the case of powders with low glass transition temperature, a preferred quantity being from 1 to 30% by weight, based on the total weight of polymeric constituents. Examples of antiblocking agents are Ca carbonate, Mg carbonate, talc, gypsum, silica, kaolins such as metakaolin, and silicates with particle sizes preferably in the range from 10 nm to 10 µm.

It is preferable to use the polymers in the form of protective-colloid-stabilized aqueous dispersions, or particularly preferably in the form of protective-colloid-stabilized water-redispersible polymer powders.

The latent heat accumulators are present in microcapsules, having been incorporated or included or embedded therein. Microcapsules are generally core-shell structures. The expression core-shell structure is known to the person skilled in the art and denotes structures in which a substance or a composition (core) is encapsulated by another substance or composition (shell). The production of corresponding latent-heat-accumulating microcapsules is known by way of example from WO99/24525.

The core usually comprises the latent-heat-accumulating materials. The core preferably comprises at least 50% by weight, particularly at least 70% by weight, and most preferably at least 80% by weight, of latent-heat-accumulating materials, based on the total weight of the core of a microcapsule. The latent-heat-accumulating materials preferably have a solid/liquid phase transition in the temperature range from −20 to 120° C., particularly from 0 to 60° C., and most preferably from 0 to 30° C.

Examples of latent-heat-accumulating materials are aliphatic hydrocarbon compounds, such as saturated or unsaturated $C_{10}$ to $C_{40}$-hydrocarbons, which are branched or preferably linear, for example n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and cyclic hydrocarbons, for example cyclohexane, cyclooctane, cyclodecane; aromatic hydrocarbon compounds such as benzene, naphthalene, biphenyl, o- and m-terphenyl, $C_1$ to $C_{40}$-alkyl-substituted aromatic hydrocarbons, such as dodecylbenzene, tetradecylbenzene, hexadecylbenzene, hexylnaphthalene, and decylnaphthalene; saturated or unsaturated $C_6$ to $C_{30}$-fatty acids, such as lauric, stearic, myristic, palmitic, oleic, or behenic acid; fatty alcohols, such as lauryl, stearyl, oleyl, myristyl, and cetyl alcohol, or coconut fatty alcohol; $C_6$ to $C_{30}$-fatty amines, such as decylamine, dodecylamine, tetradecylamine, or hexadecylamine; esters such as $C_1$ to $C_{10}$-alkyl esters of fatty acids, for example propyl palmitate, methyl stearate, and methyl palmitate, and methyl cinnamate; natural and synthetic waxes such as montanic acid waxes, montanic ester waxes, carnauba wax, polyethylene wax, oxidized waxes, polyvinyl ether wax, ethylene-vinyl acetate wax, and hard waxes from Fischer-Tropsch processes; halogenated hydrocarbons, such as chloroparaffin, bromooctadecane, bromopentadecane, bromononadecane, bromoeicosane, and bromodocosane.

The shell of the microcapsules is usually composed of polymers. The shell polymers are generally based on one or more of the abovementioned ethylenically unsaturated monomers, and usually on one or more polyfunctional monomers.

Examples of polyfunctional monomers are esters or ethers of diols or of polyols with acrylic acid or methacrylic acid, and also the diallyl and divinyl ethers of these diols. Preference is given to trimethylolpropane triacrylate and trimethylolpropane trimethacrylate, triallyl ether of pentaerythritol, pentaerythrityl tetraacrylate, ethanediol diacrylate, divinylbenzene, ethylene glycol dimethacrylate, butylene 1,3-glycol dimethacrylate, methallylmethacrylamide, allyl methacrylate, and in particular propanediol diacrylate, butanediol diacrylate, pentanediol diacrylate, and hexanediol diacrylate, and the corresponding methacrylates.

The proportion of the polyfunctional monomers is usually up to 80% by weight, preferably from 5 to 60% by weight, and particularly preferably from 10 to 50% by weight, based on the total weight of the monomers that form the shell of the microcapsules.

The particle sizes of the microcapsules are preferably from 1 to 35 µm, and particularly preferably from 3 to 10 µm (determined by means of statistical light scattering by using TGV-Coulter LS 13320 equipment).

The ratio by weight of the polymers based on one or more ethylenically unsaturated monomers to the microcapsules comprising one or more latent heat accumulators in the mixtures for the thermoplastic forming techniques is preferably from 4:1 to 1:4, particularly preferably from 3:1 to 1:3, still more preferably from 2:1 to 1:2, and most preferably 1:1.

The mixtures for the thermoplastic forming techniques are based on preferably from 10 to 90% by weight, particularly preferably from 30 to 70% by weight, and most preferably from 40 to 60% by weight, of polymers based on one or more ethylenically unsaturated monomers; and/or preferably from 10 to 90% by weight, particularly preferably from 30 to 70% by weight, and most preferably from 40 to 60% by weight, of microcapsules which comprise one or more latent heat accumulators, based in each case on the dry weight of the mixtures.

The quantities of alternative polymers, such as polyurethanes, present in the mixtures are preferably less than 20% by weight, particularly preferably less than 10% by weight, and even more preferably less than 5% by weight, based in each case on the dry weight of the mixtures. It is most preferable that the mixtures comprise no polyurethane.

Other materials that can optionally be used in the production of the moldings or sheet material comprising latent heat accumulators are additional substances such as lubricants, for example calcium stearate or zinc stearate, commonly used flame retardants, plasticizers, antioxidants, UV stabilizers, antistatic agents, adhesion promoters, antiblocking agents, dyes, pigments, fillers, processing aids, and peroxides such as peroxodicarbonate for postcrosslinking. Preference is given here to lubricants and flame retardants. By way of example, from 3 to 10% by weight of flame retardants can be present, based on the dry weight of the mixtures.

The mixtures can moreover comprise one or more fillers, such as organic fillers, based by way of example on wood, leather, cork, or coconut material, or inorganic fillers, such as gypsum, lime, chalk, talc, silicas, kaolins, silicates, or titanium dioxide. It is preferable that the quantities of fillers present in the mixtures for the thermoplastic forming techniques are less than 30% by weight, particularly less than 15% by weight, and more preferably less than 5% by weight, based in each case on the dry weight of the respective mixture. It is most preferable that the mixtures comprise no fillers.

The individual constituents of the mixtures are mixed, and are then processed by means of the conventional thermoplastic forming techniques to give moldings or sheet materials comprising latent heat accumulators. Preference is given to dry mixtures here. However, it is also possible by way of example to use mixtures in aqueous form.

The mixing can by way of example be achieved in a heatable/coolable mixer, or else by way of direct granulation, for example in an extruder, Palltruder, or agglomerator. It is preferable that the mixing is achieved in a multiscrew extruder, planetary-gear extruder, and particularly in a twin-screw extruder, in particular in a contrarotating twin-screw extruder.

Examples of suitable thermoplastic forming techniques are extrusion, injection molding, pressing, granulation, and calendering. Preference is given to extrusion, and in particular to pressing.

It is preferable to begin by using thermoplastic forming techniques to produce granulates, pellets or pulverulent compound materials, which are then further processed by using further thermoplastic forming techniques. The particle sizes of the granulates or pellets are preferably from 2 to 10 mm.

The processing temperature during the mixing process is generally from 0° C. to 120° C., preferably from 20° C. to 100° C., and particularly preferably from 40° C. to 100° C. The processing temperature during the thermoplastic processing is generally from 80° C. to 250° C., preferably from 100° C. to 180° C. The temperature ranges mentioned are particularly advantageous for providing intimate mixing of the polymers, in particular the polymers in the form of water-redispersible polymer powders, and of the other components, and for developing the binder effect of the polymers. Higher temperatures can lead to formation of degraded products.

The procedure of the invention is suitable for the production of a very wide variety of moldings or sheet materials, for example sheets, foils, webs, or any other roll product. The moldings or sheet materials can be processed with other materials to give composite materials, for example via adhesive bonding onto timber boards with woodworking glue. Corresponding products are used by way of example in the construction industry, in particular in the construction of parts of buildings or of constituents of buildings, for example ceilings, walls, or floors. Other application sectors are the shoe industry, apparel industry, sports industry, leisure industry, and in particular the furniture industry.

Surprisingly, the proportions of the microcapsules that are damaged during the procedure of the invention, despite the thermoplastic processing, are preferably less than 3% by weight, particularly preferably less than 2% by weight, and most preferably less than 1% by weight; the meaning of "damaged" here is that the heat-accumulating material can escape from the microcapsules as a consequence of the thermoplastic processing.

In particular the copolymers comprising ethylene units are particularly advantageous for the processability of the mixtures of the invention. The polymer glass transition temperatures Tg of the invention are also useful for the processability of the mixtures. Copolymers comprising units of vinyl acetate and ethylene are particularly advantageous for the further processing of the moldings or sheet materials, for example by means of adhesive bonding, for example with woodworking glue.

The moldings or sheet materials produced in the invention feature high mechanical strength values, even when proportions of microcapsules or other constituents are very high. It is possible to introduce surprisingly large quantities of latent-heat-accumulating microcapsules into the moldings or sheet materials, i.e. to achieve high fill levels. The shape, and in particular the layer thickness, of the products of the invention can also be varied within a relatively wide range. Sheet materials with homogeneous surface are moreover obtainable. It is pleasing to note that no, or very little, foaming occurs during the conduct of the process of the invention, in contrast to the casting-resin process, for example using polyurethane casting resins. The moldings or sheet materials produced are markedly more compact and have fewer air inclusions. It is possible to achieve "continuous" production of sheet materials in different thicknesses. Surfaces produced are smooth and pore-free, and can be passed directly on for further processing.

The examples below serve for further explanation of the invention:

The following materials were used:

Vinnex A, B, and C:

Polyvinyl-alcohol-stabilized copolymers in the form of water-redispersible polymer powders with the following glass transition temperatures Tg:

Vinnex A: Tg 16° C.;
Vinnex B: Tg −14° C.;
Vinnex C: Tg −7° C.

Micronal DS 5040 X:

Microcapsules which comprise paraffin (phase transition temperature 23° C.) as heat-accumulating material and having a shell composed of a high crosslinked polymethyl methacrylate.

Process: Production of the sheet materials by means of pressing (examples 2 to 4):

The materials mentioned in the table were mixed in the quantitative proportions mentioned in the table for 5 min at 130° C. on a roll mill. The resultant milled sheet was then processed in a static press at a temperature of 150° C. and at a pressure of 5 N/mm² with a press time of 5 min to give pressed sheets of thickness 2 mm.

Process: Production of the sheet materials by means of extrusion (example 1):

The materials mentioned in the table were mixed in the quantitative proportions mentioned in the table for 5 min in a cooling mixer. The mixture was then processed in a Weber DS85 twin-screw extruder with EMO sheet die to give sheet materials of thickness 8 mm.

TABLE

|  | Ex. 1 | Ex. 2 | Ex. 3 | Ex. 4 |
|---|---|---|---|---|
| Process | Extrusion | Pressing | Pressing | Pressing |
| Micronal DS 5040 X [pts. by wt.] | 50 | 50 | 50 | 50 |
| Vinnex A [pts. by wt.] | 50 |  |  | 50 |
| Vinnex B [pts. by wt.] |  | 50 |  |  |
| Vinnex C [pts. by wt.] |  |  | 50 |  |
| Shore A | 90.3 | 65.6 | 77.4 | 91.7 |
| Shore D | 31.6 | 10.6 | 16.4 | 30.1 |
| Tensile stress [MPa] | 4.31 | 1.74 | 2.33 | 5.58 |
| Tensile strain [%] | 87.86 | 331.9 | 261.6 | 126.9 |
| Tensile modulus of elasticity | 378.02 |  |  |  |
| DSC measurement [Jg⁻¹] | 47.99 | 44.09 | 43.46 | 46.02 |

Testing:

Shore A hardness, and also Shore D hardness, was determined on the pressed sheets in accordance with DIN 53505.

The mechanical strength of the pressed sheets was determined in the tensile test by determining tensile stress and tensile strain at break, and tensile modulus of elasticity was determined in accordance with DIN EN ISO 527 1-3 and, respectively, DIN 53504.

DSC Measurement:

The heat-accumulation capacity of the sheet materials was determined by using DSC Mettler Toledo DSC1.306 equipment with the following temperature program: the respective sheet material was heated in each case at a rate of 1 K/min from 0.0° C. to 35° C., then cooled to −30° C., and finally again heated to 35° C.

The table lists the test results.

The theoretically achievable result for the heat-accumulation capacity of the sheet materials is 50 J/g. Examples 1 to 4 come very close to that value. From this it is clear that only a very small number of the microcapsules has been damaged during thermoplastic processing.

What is claimed is:

1. A process for the production of moldings or sheet materials comprising latent heat accumulators, wherein
    a dry mixture comprising one or more microcapsules and one or more protective-colloid-stabilized, water-redispersible polymer powders of polymers based on one or more ethylenically unsaturated monomers selected from the group consisting of vinyl esters, (meth)acrylic esters, vinylaromatics, olefins, 1,3-dienes, and vinyl halides, wherein said microcapsules comprise one or more latent heat accumulators,
    is processed by a thermoplastic forming technique selected from the group consisting of extrusion, injection molding, pressing, and calendering.

2. The process for the production of moldings or sheet materials as claimed in claim 1, wherein the one or more latent heat accumulators is/are selected from the group consisting of aliphatic hydrocarbon compounds, aromatic hydrocarbon compounds, saturated or unsaturated $C_6$ to $C_{30}$-fatty acids, fatty alcohols, $C_6$ to $C_{30}$-fatty amines, esters, natural and synthetic waxes, and halogenated hydrocarbons.

3. The process for the production of moldings or sheet materials as claimed in claim 1, wherein the mixture comprises the microcapsules and the polymers based on one or more ethylenically unsaturated monomers in a ratio by weight of from 4:1 to 1:4.

4. The process for the production of moldings or sheet materials as claimed in claim 1, wherein the mixture comprises less than 30% by weight of fillers, based on the dry weight of the mixture.

5. The process for the production of moldings or sheet materials as claimed in claim 1, wherein the microcapsules and the polymers based on one or more ethylenically unsaturated monomers are mixed in an agglomerator, granulator, extruder, or heatable/coolable mixer.

6. The process for the production of moldings or sheet materials as claimed in claim 1, wherein a roll product is produced.

7. The process for the production of moldings or sheet materials as claimed in claim 1, wherein one or more latent heat accumulators comprise one or more $C_1$ to $C_{10}$-alkyl esters of fatty acids.

8. The process for the production of moldings or sheet materials as claimed in claim 1, wherein a sheet, foil or web is produced.

* * * * *